United States Patent
Nyenhuis et al.

(10) Patent No.: US 6,195,783 B1
(45) Date of Patent: Feb. 27, 2001

(54) PROCESS AND APPARATUS FOR SYNCHRONIZING THE BLOCK COUNTER IN AN RDS RADIO DATA RECEIVER

(75) Inventors: Detlev Nyenhuis, Sibbesse; Wilhelm Hegeler, Hildesheim, both of (DE)

(73) Assignee: Blaupunkt-Werke GmbH, Hildesheim (DE)

( * ) Notice: Subject to any disclaimer, the term of this patent is extended or adjusted under 35 U.S.C. 154(b) by 0 days.

(21) Appl. No.: 08/913,371

(22) PCT Filed: Mar. 23, 1996

(86) PCT No.: PCT/DE96/00502

§ 371 Date: Sep. 19, 1997

§ 102(e) Date: Sep. 19, 1997

(87) PCT Pub. No.: WO96/31032

PCT Pub. Date: Oct. 3, 1996

(30) Foreign Application Priority Data

Mar. 27, 1995 (DE) ................................. 195 11 147

(51) Int. Cl.[7] ......................................... G06F 11/00
(52) U.S. Cl. .......................... 714/798; 714/775; 375/357
(58) Field of Search ................................. 714/798, 762, 714/763, 775; 375/340, 357, 365; 370/347

(56) References Cited

U.S. PATENT DOCUMENTS

| | | | |
|---|---|---|---|
| 3,550,082 | * 12/1970 | Tong | 714/775 |
| 4,945,533 | * 7/1990 | Schroeder et al. | 370/287 |
| 4,984,249 | * 1/1991 | Long et al. | 375/293 |
| 5,084,891 | * 1/1992 | Ariyavisitakul et al. | 714/775 |
| 5,111,463 | * 5/1992 | Zook | 714/762 |
| 5,157,669 | * 10/1992 | Yu et al. | 714/758 |
| 5,173,925 | * 12/1992 | Mizoguchi | 375/232 |
| 5,225,839 | * 7/1993 | Okurowski et al. | 342/174 |
| 5,325,372 | * 6/1994 | Ish-Shalom | 714/757 |
| 5,392,289 | * 2/1995 | Varian | 714/707 |
| 5,396,653 | * 3/1995 | Kivari et al. | 455/88 |
| 5,430,740 | * 7/1995 | Kivari et al. | 714/782 |
| 5,452,333 | * 9/1995 | Guo et al. | 375/371 |
| 5,473,615 | * 12/1995 | Boyer et al. | 714/704 |
| 5,539,751 | * 7/1996 | Sabel | 370/514 |
| 5,546,464 | * 8/1996 | Raith et al. | 380/48 |
| 5,636,208 | * 6/1997 | Chang et al. | 370/347 |
| 5,745,503 | * 4/1998 | Kuusinen | 714/752 |
| 5,784,390 | * 7/1998 | Masiewicz et al. | 714/763 |

OTHER PUBLICATIONS

Din En 50 067—Spezifikation des Radio–DatenSystems (RDS), 1992.

* cited by examiner

Primary Examiner—Albert De Cady
Assistant Examiner—Guy J. Lamarre
(74) Attorney, Agent, or Firm—Kenyon & Kenyon

(57) ABSTRACT

A process and apparatus for synchronizing the block counter of an RDS radio data receiver is described. According to the process, the bits stored in a 26-bit shift register, are cycled at least n times in said register, n being the number of allowable offset words, and the shift register content is X-OR gated with another offset word in a given sequence for each cycle. The gating result is received by a syndrome detection circuit, which triggers a sync pulse when the zero syndrome is detected, and the sync pulse resets the bit counter to zero and sets the block counter to the address counter status assigned to the offset word in the offset word generator.

11 Claims, 4 Drawing Sheets

PROCESS AND APPARATUS FOR SYNCHRONIZING THE BLOCK COUNTER IN AN RDS RADIO DATA RECEIVER

FIELD OF THE INVENTION

The present invention relates to a process for synchronizing the block counter in an RDS radio data receiver and a circuit for carrying out the process.

BACKGROUND INFORMATION

U.S. Pat. No. 3,550,082 discloses a process for synchronizing a receiver with digitally transmitted code words formed using a non-binary, cyclic, error-correcting code. An offset word is additively superimposed on the code words to be transmitted, with a symbol of the alphabet being assigned to each symbol of the code word. In the receiver, the offset word is subtracted from the transmission signal and an error sample is generated by the generator polynomial underlying the code from the code word thus obtained, using polynomial division; the error sample is characteristic for the amount of deviation of the receiver's synchronization. Using a comparison of the error sample with all possible error samples, the exact amount of the synchronization deviation can be determined and thus the synchronization of the receiver can be restored.

The radio data system (RDS) is defined in DIN EN 50 067.

According to that reference, the information intended for the receiver is transmitted in groups. The individual groups are analyzed in different manners by the receiver. Each group consists of four blocks. One code word is transmitted in each block. Each code word consists of 26 bits, the first 16 bits of which are assigned to the information word and the following 10 bits are assigned to the check word. An additional offset word, also transmitted within the block and recognized as such in the receiver, is superimposed on each check word during transmission.

Depending on the group definition, either the same offset word (E) is superimposed on each block in the group or three offset words (A, B, D) used within a group form a cycle of four offset words with an additional variable offset word (C, C'). The cyclic use of offset words allows the transmitter to mark and the receiver to recognize the start of a group; when one of the cyclically used offset words is recognized in the receiver, its position in the group is also recognized. If the status of the block counter in the receiver matches this position at this time, the group clock that can be picked up at the block counter output is generated in the receiver synchronously with the transmitter. This allows the transmitted information words to be supplied to the analyzer.

When a receiver is turned on, or in the case of a switchover to another transmitter or a longer shutdown of the transmitter, this match must be established for the first time or re-established, i.e., the receiver must be synchronized with the current transmitter. In Attachment C to the aforementioned DIN Standard EN 50 067, an embodiment of the block and group synchronization is explained for information. In the conventional embodiment for synchronization, the bits picked up at the output of the RDS receiver are supplied sequentially at the bit frequency to a 26-bit shift register. The stored bits are caused to cycle once in the shift register during each bit period and are received in a syndrome detection circuit, with an upstream register for polynomial division, for detection of the superimposed offset word. If the 26 bits stored in the shift register at a given time belong to the same block, a syndrome assigned to the offset word is detected in the circuit and a sync pulse can be picked up at the syndrome detection circuit output assigned to the recognized syndrome. This sync pulse is then analyzed in a control circuit, which, among other things, comprises a flywheel circuit.

SUMMARY OF THE INVENTION

The invention differs from this conventional process by the features depicted in FIG. 1 and summarized below.

The present invention provides a new method for synchronizing the receiver with the transmitter, taking advantage of the fact that a data processor allows a considerably higher data processing speed than that used in the conventional process.

In contrast to the related art, according to the present invention the stored 26 bits are sequentially X-OR gated once in a bit period with the bits of each of the defined offset words generated by an offset word generator in the data processor. This offset word generator is controlled by a counter whose status for the individual offset words corresponds to the normal assignment. At least six cycles of the stored bits are required for gating in each bit period according to the current definition. After each gating, the respective syndrome is computed; it becomes zero when the cycling 26 bits belong to the same block and when the offset word assigned to this block is used for the X-OR gating. When the syndrome becomes zero, the data processor in the radio data receiver is in sync with the transmitter-side data processor. To synchronize the remaining processes in the data processor, the block counter is set to the status assigned to the offset word used in the counter of the offset word generator when offset words are used cyclically, and the bit counter is reset to zero.

An advantage of the process according to the present invention is obtained by setting the block counter, for example, to the status of the two lowest positions of an address counter that controls the sequence for generating the offset words in the offset word generator.

An additional advantage or the process according to the present invention is obtained by employing, for example, a flywheel circuit to count the number of detections of the zero syndrome.

An additional advantage of the process according to the present invention is obtained by, for example, incrementing the number of detections in the flywheel circuit by one if, when the sync pulse occurs, correct or correctable data are stored in the shift register, and decrementing the number by one if the sync pulse occurs outside a block clock pulse or with an incorrect offset word.

The above and other advantages are obtained with a circuit according to the present invention, which, for example, offers a simple design of a control unit and a flywheel circuit and a simple design for the implementation of the syndrome detection circuit.

DETAILED DESCRIPTION OF THE INVENTION

The modulated carrier frequency emitted by the remote RDS transmitter is received by a radio receiver 1 in a conventional manner and demodulated (not shown) in it. The MPX signal is available at the output of the demodulator in radio receiver 1. The low-frequency component of the MPX signal, which is not relevant here, is made audible by the speaker of the radio receiver.

Figure 1:
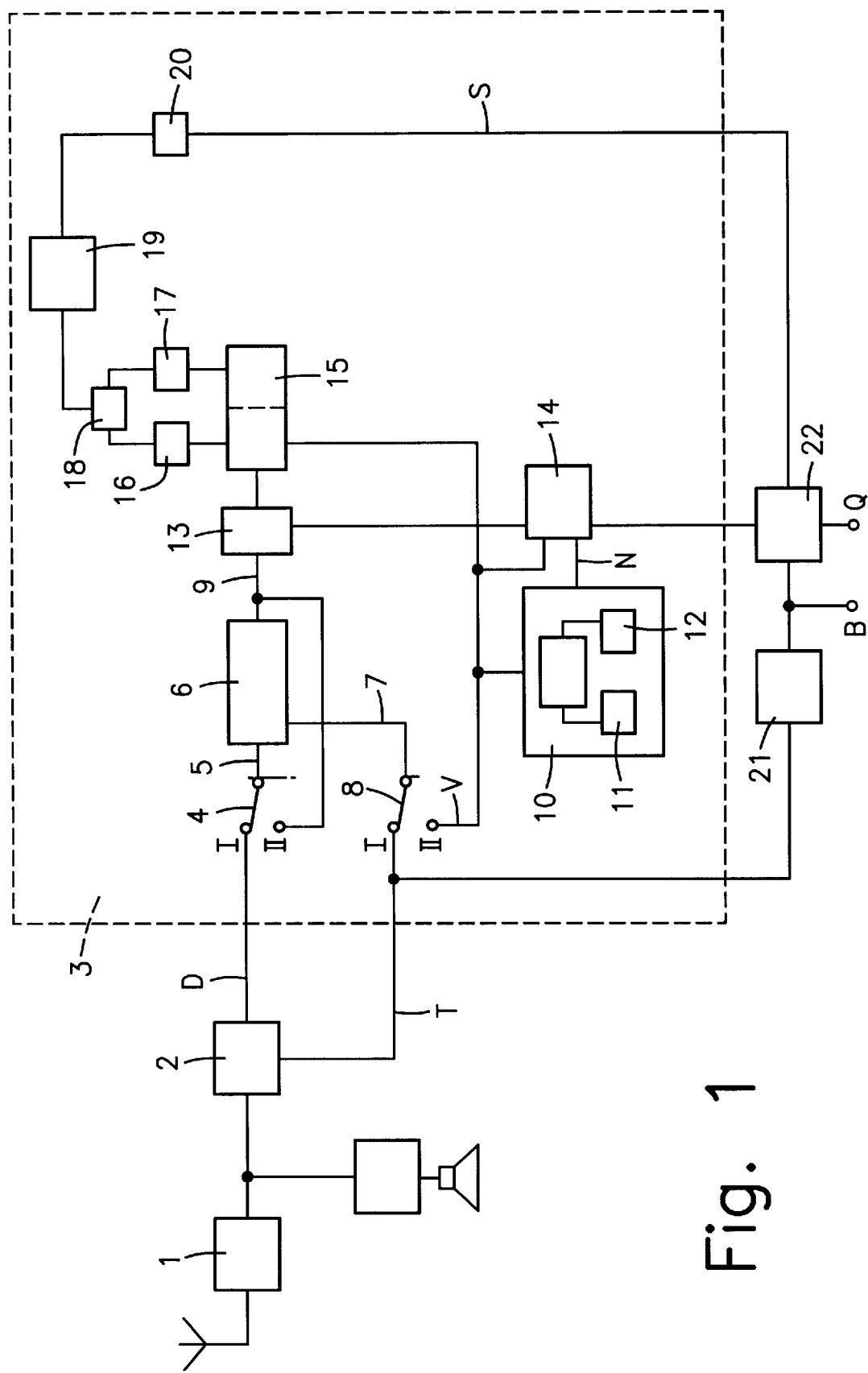
FIG. 1 shows a block diagram of an exemplary data processor according to the present invention.
Figure 2:
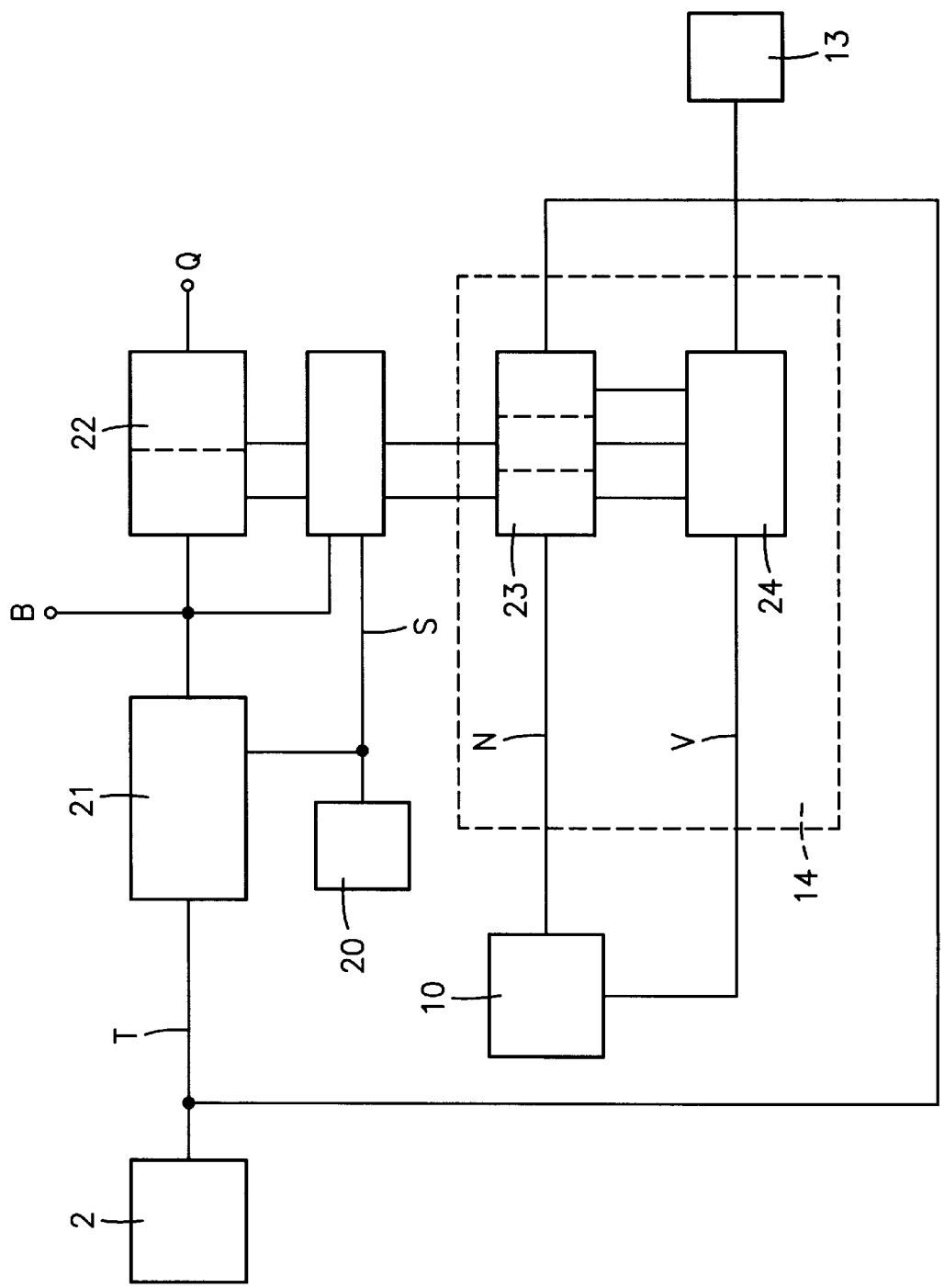
FIG. 2 shows a detailed block diagram of an exemplary circuit block according to the present invention for synchronizing the block counter.

To analyze the data transmitted on the 57 kHz auxiliary carrier, a radio data receiver 2 is connected to the MPX output of the radio receiver. Its design conforms, for example, to DIN EN 50 067, FIG. 2 on p. 5. This radio data receiver 2 is terminated by a data processor 3, which receives the continuous bit stream and a regenerated 1.1875 kHz bit clock from the radio data receiver.

The information words relevant to the device user, which are transmitted, together with the assigned check word and the superimposed offset word in equal-length 26-bit blocks, are embedded in the transmitted bit stream. To receive back the information word, data processor 3 must be able to recognize the start of a block in the bit stream when the receiver is turned on or after switch-over to another transmitter or even during a persistent erroneous transmission. For this purpose, the status of block counter 22 in the receiver must be brought into sync with the counter status of the block counter in the RDS transmitter, and a bit counter 21 must be reset to zero at the start of a block. The data processor components described below serve this purpose.

A data changeover switch 4, connecting input 5 of a 26-bit shift register 6 to data line D in its position I, is located at the input of data processor 3; data line D is connected to the output of the difference decoder of radio data receiver 2 presented, for example, in DIN EN 50 067. At the beginning of each bit cycle, which can be picked up from the radio data receiver via bit clock line T, the bit that appears at the output of the difference decoder is supplied to shift register 6. Similarly, the 26 bits already stored in shift register 6 are shifted by one position, deleting the oldest bit in the shift register.

The shift of the contents of shift register 6 is controlled via its clock input 7. A clock changeover switch 8, which in its position I connects clock input 7 with bit clock line T, is located in the line leading to clock input 7.

Data changeover switch 4 in its position II is connected to output 9 of shift register 6, which enables the contents of shift register 6 to rotate in said shift register. The rotation of the contents is controlled by a control device 10, receiving clock pulses from, for example, a 456-kHz generator 11 and, for example, a 9.5-kHz generator 12, via clock changeover switch 8 in its position II. The frequency of these generators can also be selected to be considerably higher. Further details of control unit 10 are explained later with reference to FIG. 3. Control unit 10 controls, among other things, the simultaneous switching of data changeover switch 4 and clock changeover switch 8.

Data output 9 of shift register 6 is permanently connected to the first input of a first X-OR element 13. Its second input is connected to the output of an offset word generator 14, which is also clocked by control unit 10. The output of X-OR element 13 is connected to the data input of a 10-bit syndrome register 15.

The ten cells of syndrome register 15 are connected to one another for syndrome computation, e.g., in a manner described in DIN EN 50 067, p. 34, FIG. B4, so that it will not be illustrated here. In addition, the outputs of the first five cells of syndrome register 15 are combined in a first NOR element 16, and the last five cells are combined in a second NOR element 17. The outputs of these two NOR elements 16, 17 are in turn combined in an AND element 18. A sync pulse is obtained at this AND element when the computed syndrome becomes zero, i.e., when there is a zero in all cells of syndrome register 15. Thus the three gate circuits 16, 17, and 18 form a 10-bit NOR circuit and, together with syndrome register 15, a detection circuit for the zero syndrome.

The syndrome computed in syndrome register 15 becomes zero in the case of erroneous reception when a full block is stored in shift register 6 and also the stored block has been gated with the offset word assigned to it at the sender through X-OR element 13. At this moment, block counter 22 can be synchronized. The sync pulse on line S connected to the output of AND element 18 displays this status if the block has been received without error. The sync pulses are counted in a flywheel circuit 19, to whose output gate circuit 20 is connected. These two components are described later.

Among other things, the sync pulse is used by data processor 3 to reset block counter 22 after a sync failure with the help of offset word generator 14. This is explained in more detail with reference to FIG. 2.

As mentioned previously, the bit clock is regenerated in radio data receiver 2 and transmitted to data processor 3 via bit clock line T. In addition, 26 bit cycles are counted in bit counter 21. The overflow of bit counter 21 provides block clock B. The number of block cycles is counted in block counter 22. Block counter 22 is configured as a 2-bit counter due to the aforementioned standard, according to which four blocks form one group. Its overflow provides the group clock. One of the offset words, which is repeated in the same sequence within each group (A, B, C, D) is permanently assigned to each block of each group.

Instead of offset word C, offset word C' can, for example, also be used. Although it differs from offset word C, the block counter has the same status when offset word C' is used as it does for offset word C. Furthermore, an additional offset word E is defined, which is used for specific radio data services, i.e., in specific groups in each block, and thus is irrelevant for an object of the present invention, which is synchronization of the block counter. It is, however, also recognized in data processor 3.

Offset word generator 14, which generates all offset words, including offset word E, comprises, for example, an address counter 23, clocked by control unit 10 via address counter clock line N. For each new status of address counter 23, the offset word assigned to this counter status is read from, for example, a ROM 24 and supplied to X-OR element 13. If a control signal appears on line S for a certain counter status, then the offset word output for this counter status is correct and the status of the two lowest positions of address counter 23 is transmitted to block counter 22 for synchronization.

First, however, address counter 23 is reset at the beginning of each bit cycle, for example, to seven, and then counts the clock pulses from control unit 10, which follow one another with a clock frequency of, for example, 9.5 kHz on address counter line N. The counting mode of address counter 23 is designed so that, for cyclically used offset words, the status of the two lowest positions corresponds to the block to which the offset word used is assigned. For example, offset word D is generated in the zero position of the address counter and offset words A and B are generated in the first two positions of address counter 23 in this sequence, while the variable offset words C and C' are generated in the third and seventh position.

To perform multiple gating of the content of shift register 6 in a bit period with the different offset words, the content of said shift register is often (i.e., at least n times in each bit period, n being the number of allowable offset words) cycled through control unit 10 in shift register 6. For this purpose, control unit 10 must deliver a packet of 26 shift pulses for each cycle and open a time window between two cycles for evaluating the syndrome obtained.

Figure 3:
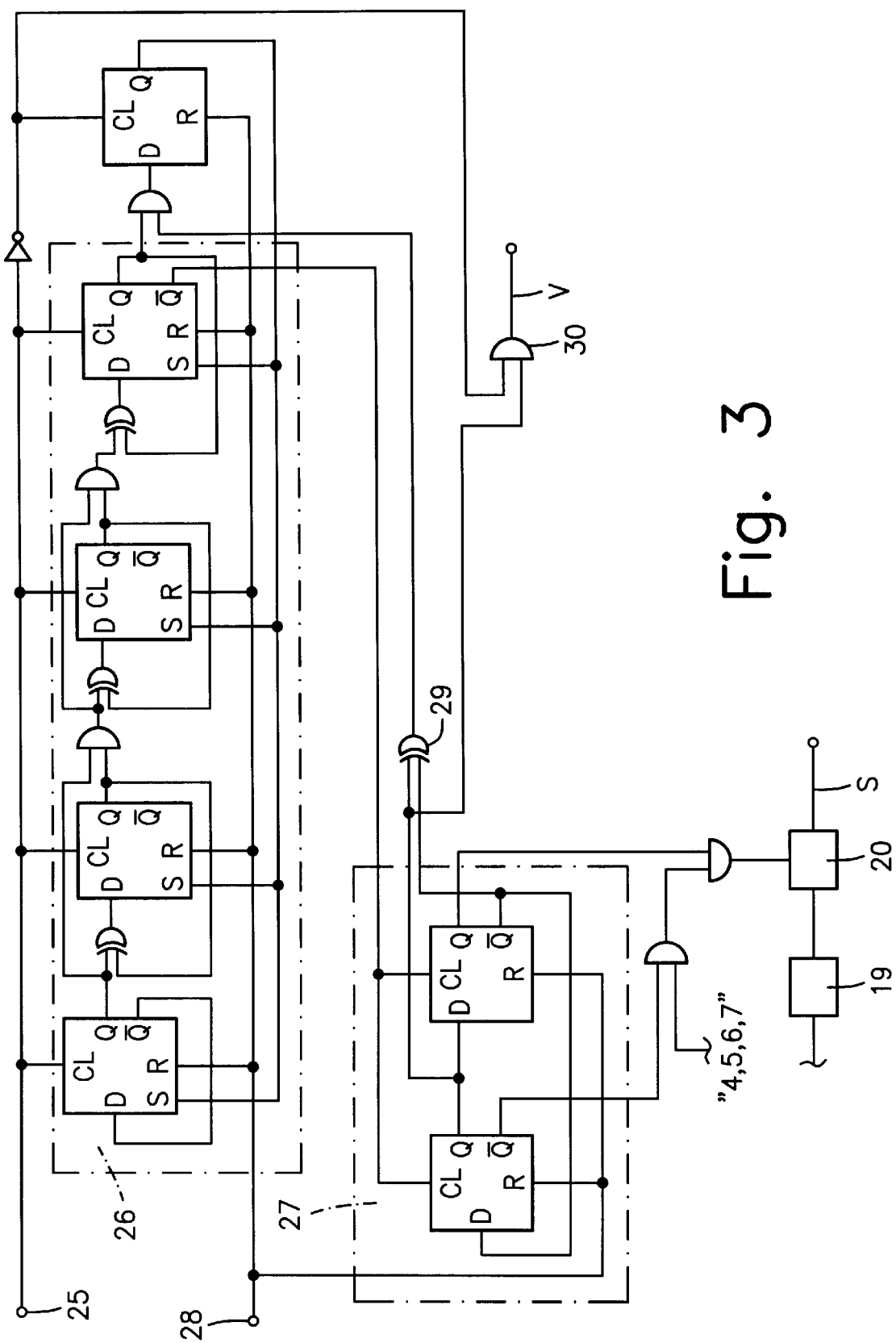
FIG. 3 shows a detailed block diagram of an exemplary control unit for a data processor according to the present invention.

The design of control unit 10 is explained in detail below with reference to FIG. 3. A generator 11 with frequency of, for example, 456 kHz connected to input 25 of a 4-bit counter 26. The pulses of generator 11 clock 4-bit counter 26, whose overflow in turn clocks a 2-bit counter 27. Both counters are reset using a reset pulse applied to reset input 28. Control unit 10 is designed so that 4-bit counter 26 counts alternatingly to ten or sixteen. The count is controlled through the output of a second X-OR element 29 at the output of 2-bit counter 27.

When 4-bit counter 26 has counted to four in the first status (0.0) of 2-bit counter 27, changeover switches 4 and 8 are brought to their position II. At the same time, syndrome register 15 is reset. In the first status (0.0) of 2-bit counter 27, 4-bit counter 26 continues to count to ten. Its overflow switches 2-bit counter 27 into its second status (1.0). In this status of 2-bit counter 27, 4-bit counter 26 counts to sixteen. During this position (1.0) and the following position (1.1) of 2-bit counter 27, where 4-bit counter 26 counts again to ten, a gate circuit 30 is opened, so that a total of 26 clock pulses appear on shift clock line V with a frequency of, for example, 456 kHz. Both the 26-bit shift register and offset word generator 14 with syndrome register 15 are controlled through this shift clock line V. They cause the contents of shift register 6 to go through a full cycle, an offset word to be output by offset word generator 14, and finally the syndrome to be simultaneously computed in syndrome register 15.

When, in the following fourth status (0.1) of 2-bit counter 27, 4-bit counter 26 counts from four to seven, a time window for syndrome analysis is opened with gate circuit 20.

At the twelfth counting pulse of 4-bit counter 26 in the fourth status (0.1) of 2-bit counter 27, a 9.5-kHz period has elapsed. A reset pulse is then output by 9.5-kHz generator 12 at reset input 28 and both counters 26 and 27 are reset, while address counter 23 is incremented by one. This makes the next offset word available for X-OR gating with the content of shift register 6 in the next cycle of control unit 10.

One cycle of control unit 10 thus includes a total of 48 pulses of the 456-kHz generator 11. The reset pulses on pulse line N follow one another with a frequency of 9.5 kHz. Thus eight packets of 26 shift pulses, separated by 22 blank pulses, are obtained on shift line V within one bit period. In this embodiment, six of the eight packets are used for synchronizing the block counter.

Figure 4:
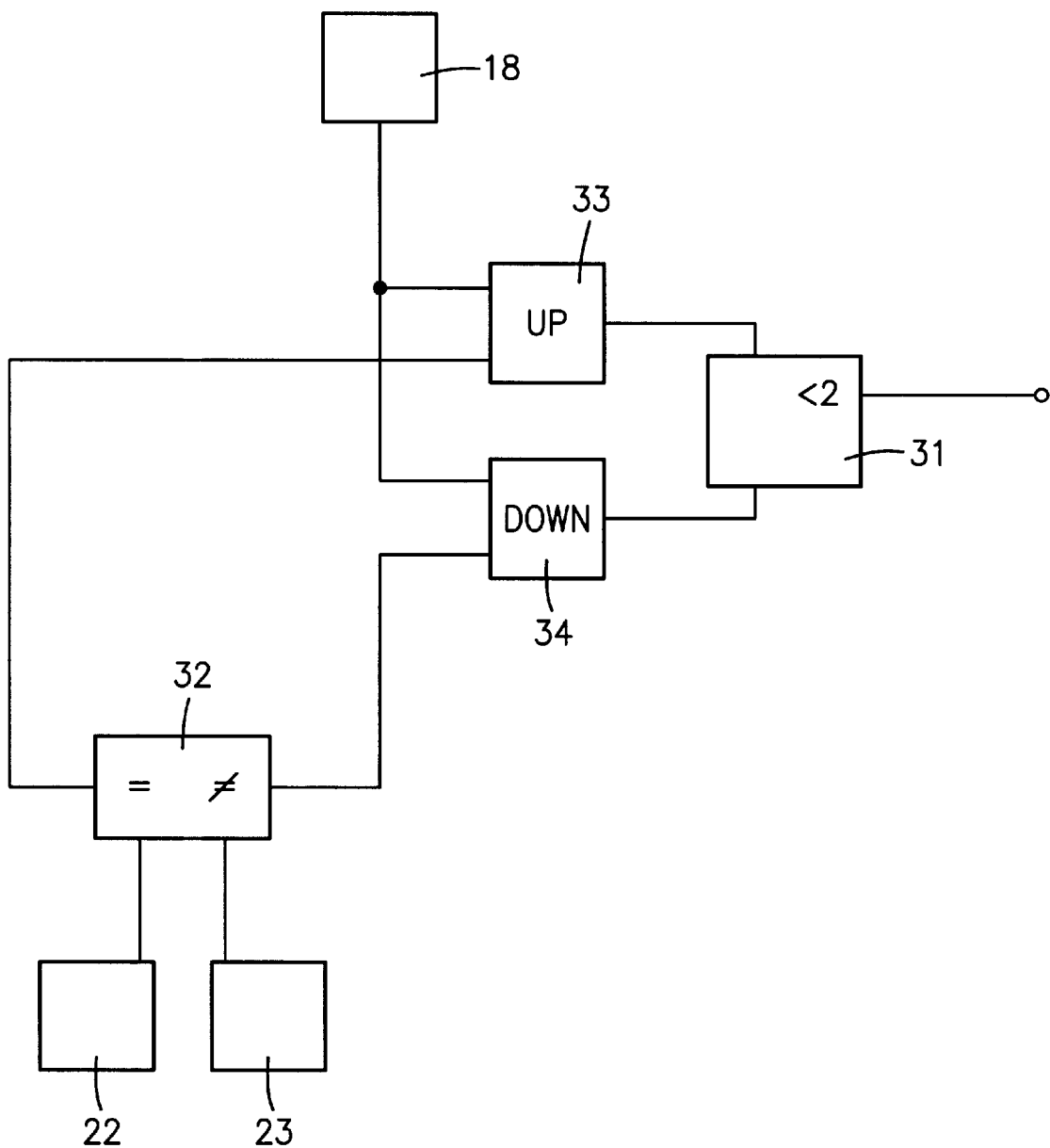
FIG. 4 shows a detailed block diagram of an exemplary flywheel circuit according to the present invention.

In our explanation of the operation of data processor 3, we have so far assumed errorless reception of the bits. This assumption does not, however, agree with actual operation. When a wrong bit is received, it may also happen that the syndrome also becomes zero in syndrome register 15 if the wrong bits stored in the shift register, together with an offset word that is not assigned to this block in the current cycle, but—as explained above—is also occasionally generated by offset word generator 14 during a bit period at the second input of the first X-OR element 13, produce the zero syndrome. The zero syndrome is also obtained if the offset word E was used on the transmitter side. In order to avoid erroneous synchronization of the block counter at the wrong status of address counter 23, flywheel circuit 19 has, for example, the design illustrated in detail in FIG. 4.

Flywheel circuit 19 comprises an up/down counter 31, which increments when the sync pulse appears on line S and also the correct offset word is applied to the first X-OR element 13. It will decrement if the sync pulse appears, but an erroneous offset word is applied or the sync pulse does not match a block clock pulse. If the status of up/down counter 31 becomes zero or drops below a predefined number, e.g., 2, the following sync pulse is used via the corresponding counter output (<2) for the aforementioned correction of the status of block counter 22. This correction takes place at each sync pulse until the status of up/down counter 31 has reached, for example, 2 again.

To detect whether the offset word corresponding to the block counter status is being applied to the first X-OR element 13, a comparator circuit 32 is used, where the status of the two lower positions of 3-bit counter 23 is compared to that of block counter 22. If agreement is obtained at the block clock pulse, the up input of up/down counter 31 is enabled via up-AND gate 33 for the sync pulse if also the syndrome is zero. If there is no agreement, its down input is enabled via down-AND gate 34 for counting the sync pulse.

Again, the process according to the present invention is not limited to the frequencies given for the embodiment. The block counter synchronization processes may occur at a considerably higher speed within a bit period.

What is claimed is:

1. A method for synchronizing a block counter in an RDS receiver, comprising the steps of:

consecutively reading in bits from an output of an RDS receiver to a 26-bit shift register, the bits having a bit frequency and being read into the shift register at the bit frequency;

cycling the bits in the shift register during a bit period for transfer into a syndrome detection circuit wherein in each bit period, the bits cycle a number of times at least equal to a number of total allowable offset words and bits are X-OR gated with bits of one of a plurality of offset words generated by an offset word generator, the bits being X-OR gated in a standard sequence controlled by an address counter prior to being transferred into the syndrome detection circuit; and triggering a sync pulse via the syndrome detection circuit for predetermined cyclically used offset words, the sync pulse being generated when a zero syndrome is detected, the sync pulse setting a block counter to a status of the address counter and resetting a bit counter to zero when the one of the plurality of offset words is a predetermined offset word.

2. The method according to claim 1, wherein the block counter has a block counter status, the block counter status being set to a status of two lowest positions of the address counter, the address counter controlling the generating of the plurality of offset words in the offset word generator.

3. The method according to claim 1, further comprising the step of counting detections of the zero syndrome in a flywheel circuit, and wherein the sync pulse is only triggered if, when a zero syndrome is detected, a number of previous detections of the zero syndrome is less than a predefined number.

4. The method according to claim 3, wherein the number of detections of the zero syndrome is incremented by one if, when the sync pulse occurs, one of correct data and correctable data is stored in the shift register, and the number of detections of the zero syndrome is decremented by one if the sync pulse occurs one of outside a block clock pulse and with an incorrect offset word.

5. A circuit for synchronizing a block counter in an RDS receiver, comprising:

a shift register having a clock input and an output;

an offset word generator having a clock input and an address counter, the address counter having a count input;

a first X-OR element having a first input, a second input, and an output, the first input of the first X-OR element connected to the output of the shift register and the second input of the first X-OR element connected to the offset word generator;

a syndrome detection circuit comprising:
a syndrome register having an input, a clock input and an output, the input of the syndrome register connected to the output of the first X-OR element; and
a first gate circuit having an input, a clock input, and an output, the input of the first gate circuit connected to the syndrome register, the first gate circuit detecting a zero syndrome;

a control unit connected to the clock input of the shift register, to the clock input of the offset word generator, to the clock input of the syndrome register, and to the count input of the address counter, the control unit generating packets of twenty-six cycling pulses for the shift register and the syndrome register a number of times in a bit period equal to a number of allowable offset words plus a freely selectable number, the control unit delivering a number of counting pulses in each bit period equal to the number of allowable offset words; and a block counter having a block counter status, the block counter connected to the address counter and receiving an address counter status, wherein the syndrome detection circuit compares a syndrome obtained from radio data to a predefined syndrome and, when the syndromes match, triggers a sync pulse.

6. The circuit according to claim 5, wherein the shift register includes a 26-bit shift register and the first gate circuit includes a 10-bit NOR circuit.

7. The circuit according to claim 6, wherein the syndrome register has a plurality of cells, each of the plurality of cells having an output, the outputs of the plurality of cells being combined in the first gate circuit, and the output of the first gate circuit is adapted to pick up the sync pulse.

8. The circuit according to claim 5, wherein the control unit comprises:

a first generator having an output, the first generator generating first generator pulses;

a 4-bit counter having an input and an overflow, the input-of the 4-bit counter connected to the output of the first generator, the 4-bit counter dividing the first generator pulses selectively by one of ten and sixteen;

a 2-bit counter connected to the overflow of the 4-bit counter, the 2-bit counter having a first position, a second position, a third position, and a fourth position; and a second generator generating second generator pulses;

wherein when the 2-bit counter is in one of the first position and the third position, the 4-bit counter divides the first generator pulses by ten;

wherein when the 2-bit counter is in one of the second position and the fourth position, the 4-bit counter divides the first generator pulses by sixteen;

wherein when the 2-bit counter is in one of the second position and the third position, the output of the first generator is connected via a second gate circuit to the clock input of the shift register, to the clock input of the offset word generator and to the clock input of the syndrome register; and wherein the second generator pulses reset the 2-bit counter and the 4-bit counter and increment the address counter by one.

9. The circuit according to claim 8, wherein the first generator includes a 456 kHz generator and the second generator includes a 9.5 kHz generator.

10. The circuit according to claim 5, further comprising:

an up/down counter having at least two count inputs, one of the count inputs having an up-AND gate and another of the count inputs having a down-AND gate, each of the up-AND gate and the down-AND gate having a first input and a second input; and a comparator circuit having an equality output and an inequality output, the comparator circuit comparing the address counter status with the block counter status;

wherein the first input of the up-AND gate and the first input of the down-AND gate are connected to the output of the first gate circuit;

wherein the second input of the up-AND gate is connected to the equality output of the comparator circuit; and wherein the second input of the down-AND gate is connected to the inequality output of the comparator circuit.

11. The circuit according to claim 10, wherein the syndrome register has a plurality of cells, each of the cells having an output, the outputs of the plurality of cells being combined in the first gate circuit, and the output of the first gate circuit is able to pick up the sync pulse;

wherein the control unit comprises:

a first generator having an output, the first generator generating first generator pulses;

a 4-bit counter having an input and an overflow, the input of the 4-bit counter connected to the output of the first generator, the 4-bit counter dividing the first generator pulses optionally by ten or sixteen;

a 2-bit counter connected to the overflow of the 4-bit counter, the 2-bit counter having a first position, a second position, a third position, and a fourth position; and a second generator generating second generator pulses;

wherein when the 2-bit counter is in one of the first position and the third position, the 4-bit counter divides the first generator pulses by ten;

wherein when the 2-bit counter is in one of the second position and the fourth position, the 4-bit counter divides the first generator pulses by sixteen;

wherein when the 2-bit counter is in one of the second position and the third position, the output of the first generator is connected via a second gate circuit to the clock input of the shift register, to the clock input of the offset word generator and to the clock input of the syndrome register; and wherein the second generator pulses reset the 2-bit counter and the 4-bit counter and increment the address counter by one.

* * * * *